United States Patent
Devarayanigari et al.

(10) Patent No.: US 9,826,104 B2
(45) Date of Patent: Nov. 21, 2017

(54) METHOD FOR PREVENTING A UE FROM ENTERING INTO A PERMANENT OUT OF SERVICE STATE

(71) Applicant: Samsung Electronics Co., Ltd., Gyeonggi-do (KR)

(72) Inventors: Pavan Kumar Devarayanigari, Bangalore (IN); Seshadri Elluru, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/821,288

(22) Filed: Aug. 7, 2015

(65) Prior Publication Data
US 2016/0205650 A1 Jul. 14, 2016

(30) Foreign Application Priority Data
Jan. 8, 2015 (IN) .............................. 136/CHE/2015

(51) Int. Cl.
*H04M 15/00* (2006.01)
*H04W 8/18* (2009.01)
*H04W 8/12* (2009.01)

(52) U.S. Cl.
CPC ......... *H04M 15/7657* (2013.01); *H04W 8/18* (2013.01); *H04W 8/12* (2013.01)

(58) Field of Classification Search
CPC ...... H04M 15/7657; H04W 8/18; H04W 8/12
See application file for complete search history.

(56) References Cited

U.S. PATENT DOCUMENTS

| 8,630,647 | B2 | 1/2014 | Magadi Rangaiah et al. |
| 2007/0287419 | A1* | 12/2007 | Wang .................... H04W 60/00 455/411 |
| 2007/0298801 | A1* | 12/2007 | Kim ....................... H04W 60/00 455/436 |
| 2009/0170507 | A1* | 7/2009 | Kim ....................... H04W 60/02 455/433 |
| 2013/0316699 | A1* | 11/2013 | Jheng .................... H04W 48/18 455/423 |
| 2015/0215766 | A1* | 7/2015 | Russell .................. H04W 8/18 455/433 |

* cited by examiner

*Primary Examiner* — Moustapha Diaby
(74) *Attorney, Agent, or Firm* — The Farrell Law Firm, P.C.

(57) ABSTRACT

Methods and apparatuses are provided that prevent a user equipment (UE) from entering into a permanent out of service (OOS) state. The UE receives a registration reject message associated with a permanent cause when the UE triggers a registration request for registering with a first network entity. It is determined whether the UE was previously registered with a second network entity upon receiving the registration reject message associated with the permanent cause. The UE stores a network entity identifier of the first network entity in a temporary forbidden list when the UE was previously registered with the second network entity, to prevent the UE from entering into the permanent OOS state.

14 Claims, 6 Drawing Sheets

METHOD FOR PREVENTING A UE FROM ENTERING INTO A PERMANENT OUT OF SERVICE STATE

PRIORITY

This application claims priority under 35 U.S.C. §119(a) to an Indian Patent Application filed in the Indian Property Office on Jan. 8, 2015 and assigned Serial No. 136/CHE/2015, the entire disclosure of which is incorporated herein by reference.

BACKGROUND

1. Field of the Disclosure

The embodiments disclosed herein relate generally to mobile communication, and more particularly, to a method and system for preventing a user equipment (UE) from entering into a permanent out of service (OOS) state.

2. Description of the Related Art

A registration reject associated with a permanent cause is received from a network when a UE or a subscriber identity module (SIM) is not permitted to access services provided by the network. However, there are several scenarios in which the network issues the registration reject associated with the permanent cause even though the UE or the SIM is permitted to access the services provided by the network.

One such scenario may occur when the UE tries to register on a public land mobile network (PLMN) other than a home PLMN. More particularly, this scenario may occur when the UE tries to access a cell associated with a visited PLMN, which is not in contract with the home PLMN of the UE.

In response, the network issues the registration reject associated with the permanent cause, rather than issuing a registration reject associated with a temporary cause. As a result, the UE is unable to identify false registration reject causes issued by the network. The issuance of false registration reject causes results in the UE entering into a permanent OOS state until a next "power on" operation of the UE.

SUMMARY

An aspect of the present disclosure provides a method and system for preventing a UE from entering into a permanent OOS state.

According to an aspect of the present disclosure, a method is provided for preventing a UE from entering into a permanent OOS state. The UE receives a registration reject message associated with a permanent cause when the UE triggers a registration request for registering with a first network entity. It is determined whether the UE was previously registered with a second network entity upon receiving the registration reject message associated with the permanent cause. A network entity identifier of the first network entity is stored at the UE in a temporary forbidden list when the UE was previously registered with the second network entity, to prevent the UE from entering into the permanent OOS state.

According to another aspect of the present disclosure, a UE is provided that is configured to avoid a permanent OOS state. The UE includes a processor and a memory for storing computer-executable instructions. The instructions configure the processor to receive a registration reject message associated with a permanent cause when the UE triggers a registration request for registering with a first network entity. The instructions also configure to the processor to determine whether the UE was previously registered with a second network entity upon receiving the registration reject message associated with the permanent cause. The instructions also configure the processor to store a network entity identifier of the first network entity in a temporary forbidden list when the UE was previously registered with the second network entity, to prevent the UE from entering into the permanent OOS state.

According to another aspect of the present disclosure, a method is provided for preventing a UE from entering into a permanent OOS state. Registration with the first network entity is triggered, when a network identifier of the first network entity was not previously rejected. It is determined whether a registration reject message associated with a permanent cause is received at the UE from the first network entity. The network entity identifier of the first network entity is stored at the UE in a temporary forbidden list, when the registration reject message associated with the permanent cause is received. Invalidation of the subscriber identity module (SIM) state in the UE is skipped.

BRIEF DESCRIPTION OF THE DRAWINGS

The above and other aspects, features, and advantages will be more apparent from the following detailed description when taken in conjunction with accompanying drawings in which.

DETAILED DESCRIPTION OF EMBODIMENTS

Figure 1:
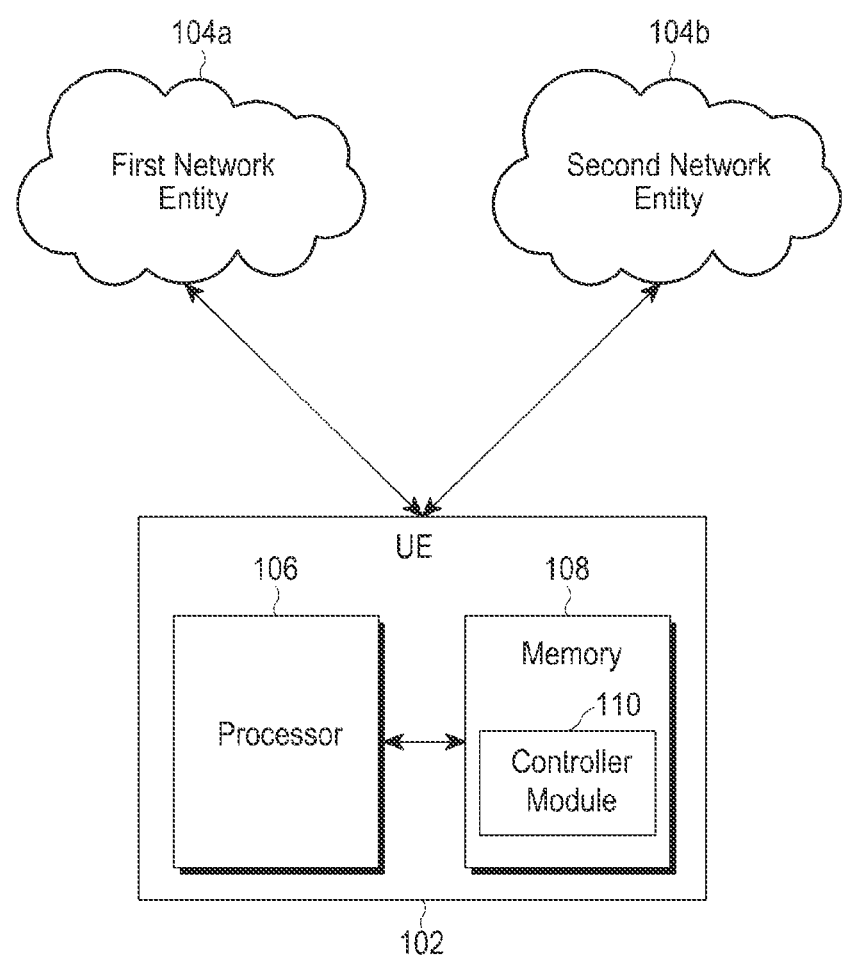
FIG. 1 is a block diagram illustrating a UE configured to prevent the UE from entering into a permanent OOS state, in accordance with embodiments described herein.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, reference may be made to "an", "one", or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "includes", "comprises", "including", and/or "comprising", when used herein, specify the presence of stated features, integers, steps, operations, elements, and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined herein, all terms (including technical and scientific terms) used herein have the same meanings as those commonly understood by one of ordinary skill in the art to which this disclosure pertains. It will be further understood that terms, such as those defined in commonly used dictionaries, should be interpreted as having meanings that are consistent with their meanings in the context of the relevant art, and will not be interpreted in an idealized or overly formal sense unless expressly so defined herein.

The embodiments herein provide a method and a UE configured to prevent the UE from entering into a permanent OOS state. The UE receives a registration reject message associated with a permanent cause when the UE triggers a registration request for registering with a first network entity. The first network entity is selected using one of a manual CSG selection, an auto-to-auto reselection, and a manual PLMN selection. The first network entity is one of a CSG cell, a non-CSG cell, and a PLMN.

The UE detects whether the UE was previously registered with at least one second network entity in response to receiving the registration reject message associated with the permanent cause from the first network entity. The second network entity is one of a CSG cell, a visited PLMN (VPLMN), and a PLMN. When the UE was previously registered with the second network entity, the network entity identifier of the first network entity is stored in the UE. The stored network entity identifier prevents the UE from entering into the permanent OOS state. The network entity identifier of the first network entity is stored in a temporary forbidden list of the UE. The network entity identifier comprises at least one of a CSG ID, a PLMN ID, and Radio Access Technology (RAT) information. In one embodiment, the first network entity and the second network entity belong to the same country.

The previous registration of the UE on the at least one second network entity implies that the registration reject associated with the permanent cause is a false registration reject. Thus, the UE is enabled to identify the false registration reject.

In an embodiment, the UE detects whether the temporary forbidden list comprises the network entity identifier, before triggering the registration request to prevent the UE from entering into the permanent OOS state.

In an embodiment, the UE determines an availability of the at least one second network entity. The UE is automatically registered with an available second network entity based on determining the availability of the at least one second network entity. Since the UE is automatically registered with the available second network entity, the UE is prevented from entering into the permanent OOS state.

Thus, the UE is able to take preventive action by detecting whether the network identity identifier of a selected network entity is present in the temporary forbidden list. When the network entity identifier is present in the temporary forbidden list, the UE skips registration with the selected network entity and registers the UE with a previously registered network entity, or searches for another available network entity.

Moreover, the embodiment allows the UE to identify a false or an invalid registration reject. If the false registration reject is issued by the network entity, the UE automatically registers with a previously registered network entity (second network entity) or searches for another available network entity. Thus, the UE is prevented from entering into the permanent OOS state.

Referring initially to FIG. 1, a block diagram illustrates a UE configured to prevent the UE from entering into a permanent OOS state, in accordance with embodiments described herein. A UE 102 may be embodied as, for example, a cellular phone, a smart phone, a wireless organizer, a personal digital assistant (PDA), a tablet, a handheld wireless communication device, or the like.

As illustrated in the FIG. 1, the UE 102 is in communication with a first network entity 104a and a second network entity 104b. The first network entity 104a is one of a CSG cell, a non-CSG cell, and a PLMN. The second network entity 104b is one of a CSG cell, a non-CSG cell, and a PLMN.

In an embodiment, the UE 102 is configured to include a processor 106 and memory 108. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 can be configured to fetch and execute computer-readable instructions stored in the memory 108.

The memory 108 may include any computer-readable medium known in the art including, for example, volatile memory, such as, for example, static random access memory (SRAM) and dynamic random access memory (DRAM), and/or non-volatile memory, such as, for example, read only memory (ROM), erasable programmable ROM, flash memories, hard disks, optical disks, and magnetic tapes. In an embodiment, the memory 108 includes a controller module 110.

The controller module 110 can be configured to receive a registration reject message associated with a permanent cause when the UE 102 triggers a registration request for registering with the first network entity 104a. The permanent cause may be usage of one of an illegal UE, an illegal SIM, and the UE not being permitted to access services. The registration request may be one of a tracking area update (TAU), a routing area update (RAU) and a location area update (LAU).

The controller module 110 can be configured to detect whether the UE 102 was previously registered with at least one second network entity 104b in response to receiving the registration reject message associated with the permanent cause from first network entity 104a. For example, the controller module 110 detects whether the UE 102 is registered with a PLMN by checking for a PLMN identifier of a registered PLMN stored in the UE 102.

If the UE 102 was previously registered with at least one second network entity 104b, a network entity identifier associated with the first network entity 104a is stored at the UE 102. The network entity identifier comprises at least one of a CSG ID, a PLMN ID, and RAT information. The network entity identifier of the first network entity 104a is stored in a temporary forbidden list of the UE 102. The temporary forbidden list is stored in the memory 108 of the UE 102. In an embodiment, the first network entity 104a and the second network entity 104b belong to the same country.

The stored network entity identifier prevents the UE 102 from entering into the permanent OOS state. In order to prevent the UE 102 from entering into the permanent OOS state, the controller module 110 can be configured to detect whether the network entity identifier is present in the temporary forbidden list of the UE 102. The controller module 110 can be configured to perform the detection before triggering the registration request for registering with the first network entity 104a. If the network entity identifier is present in the temporary forbidden list, the controller module 110 can be configured to skip the registration of the UE 102 with the first network entity 104a. If the network entity identifier is not present in the temporary forbidden list, the controller module 110 can be configured to trigger the registration request for registering with the first network entity 104a.

In an embodiment, the controller module 110 can be configured to automatically register the UE 102 with the second network entity 104b in response to detecting that the UE 102 is previously registered with the second network entity 104b. Thus, the UE 102 is prevented from entering into the permanent OOS state.

Figure 2:
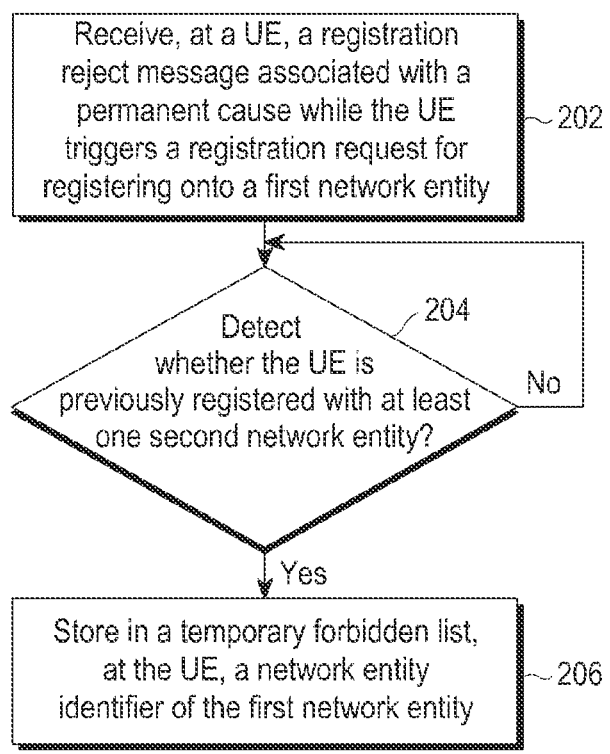
FIG. 2 is a flowchart illustrating a method for preventing the UE from entering into the permanent OOS state, in accordance with embodiments described herein.

FIG. 2 is a flowchart illustrating a method for preventing the UE from entering into the permanent OOS state, in accordance with embodiments described herein. In step 202, the UE 102 receives a registration reject message associated with a permanent cause when the UE triggers the registration request for registering with the first network entity 104a.

In step 204, it is determined whether the UE 102 was previously registered with at least one second network entity in response to receiving the registration reject message associated with the permanent cause. If the UE was not previously registered with at least one second network entity, the methodology repeats step 204. If the UE 102 was previously registered with at least one second network entity, the UE 102 stores the network entity identifier of the first network entity 104a in a temporary forbidden list of the UE 102. Storing the network entity identifier prevents the UE 102 from entering into the permanent OOS state.

The various actions, acts, blocks, steps, and the like in the method of FIG. 2 may be performed in the order presented, in a different order, or simultaneously. Further, in some embodiments, some actions, acts, blocks, steps, and the like may be omitted, added, modified, skipped, and the like, without departing from the scope of embodiments described herein.

Figure 3:
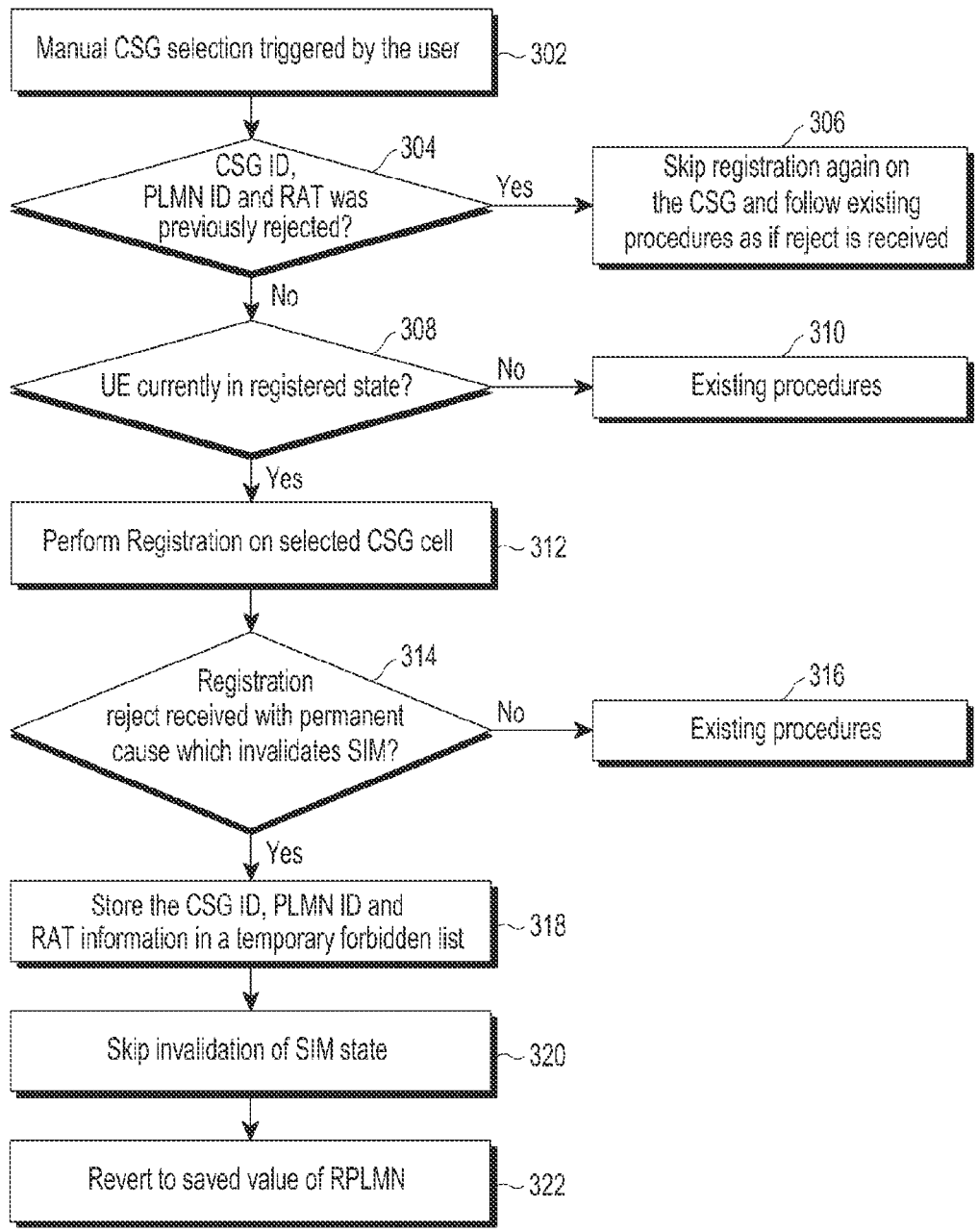
FIG. 3 is a flowchart illustrating a method for preventing the UE from entering into the permanent OOS state during a manual closed subscriber group (CSG) selection in the UE, in accordance with embodiments described herein.

FIG. 3 is a flowchart illustrating a method for preventing the UE from entering into the permanent OOS state during a manual CSG selection in the UE, in accordance with embodiments described herein. In step 302, manual CSG selection is triggered by a user of the UE. The manual CSG selection is triggered when the user selects a CSG cell. In step 304, it is determined whether a CSG identifier, a PLMN identifier, and RAT information associated with the CSG cell were previously rejected by a network entity. This determination may be performed by determining if the CSG identifier, the PLMN identifier, and the RAT information associated with the CSG cell are present in the temporary forbidden list of the UE 102. If the CSG identifier, the PLMN identifier, and the RAT information were previously rejected, registration with the CSG cell is skipped, in step 306.

If the CSG identifier, the PLMN identifier, and the RAT information were not previously rejected, it is determined whether the UE 102 is currently in a registered state. If the UE 102 is not in a registered state, the UE 102 initiates the registration procedure on the selected CSG cell, in step 310. If the UE 102 is currently in a registered state, a TAU, LAU, or a RAU is performed with a new cell associated with a PLMN, in step 312.

In step 314, it is determined whether the TAU, LAU, or RAU is rejected with the permanent cause invalidating a SIM of the UE 102. If the TAU, LAU, or RAU is not rejected with the permanent cause, the UE 102 is attached to the selected CSG cell associated with the PLMN, in step 316. If the TAU, LAU, or RAU is rejected with the permanent cause, the CSG identifier, the PLMN identifier, and the RAT information is stored in the temporary forbidden list, in step 318.

Further, in step 320, the invalidation of the SIM state is skipped. In step 322, the UE 102 automatically reverts to a saved value of a registered PLMN.

The various actions, acts, blocks, steps, and the like in the method of FIG. 3 may be performed in the order presented, in a different order, or simultaneously. Further, in some embodiments, some actions, acts, blocks, steps, and the like may be omitted, added, modified, skipped, and the like, without departing from scope of embodiments described herein.

Figure 4:
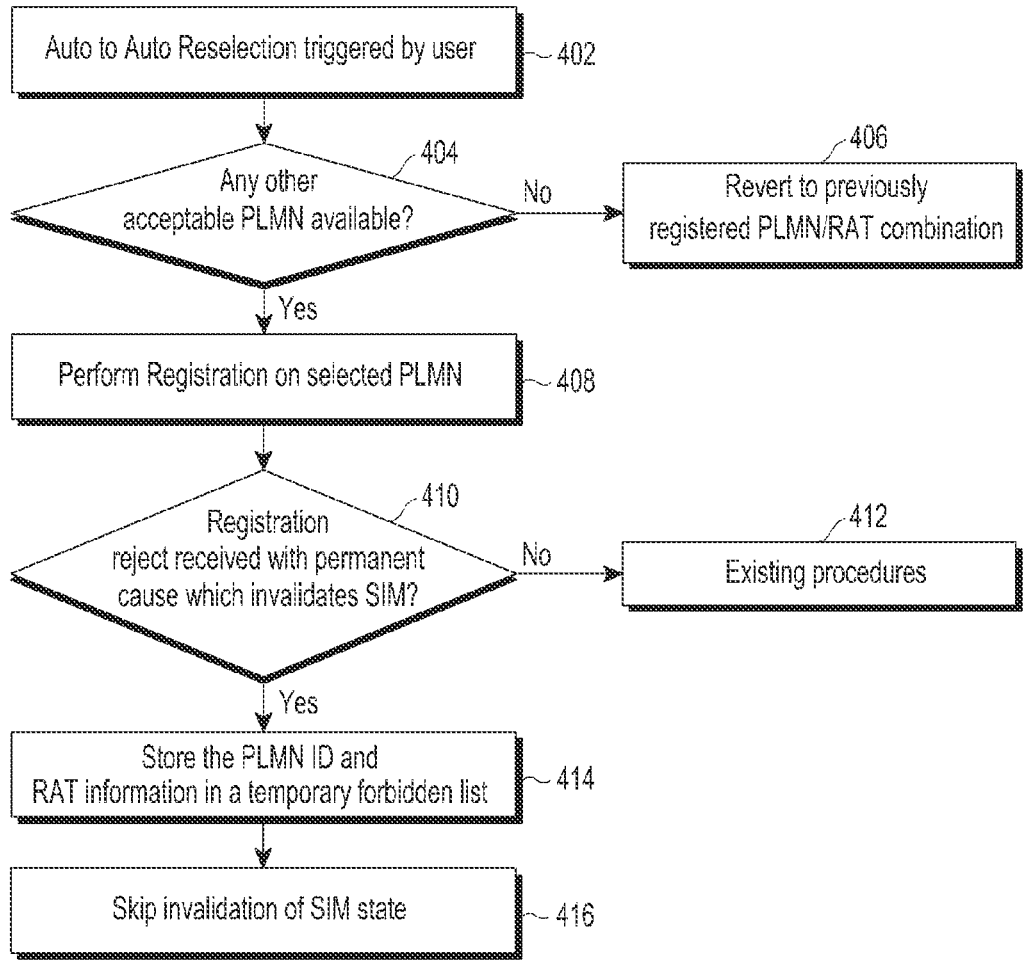
FIG. 4 is a flowchart illustrating a method for preventing the UE from entering into the permanent OOS state during an auto-to-auto reselection of a PLMN in the UE, in accordance with embodiments described herein.

FIG. 4 is a flowchart illustrating a method for preventing the UE from entering into the permanent OOS state during an auto-to-auto reselection of a PLMN in the UE, in accordance with embodiments described herein. In step 402, the auto-to-auto reselection of the PLMN is triggered by a user. In step 404, it is determined whether an acceptable PLMN, other than a previously registered PLMN, is available. The PLMN identifier of the acceptable PLMN is not in the temporary forbidden list of the UE 102. If an acceptable PLMN is not available, the UE 102 reverts to its previously registered PLMN and RAT combination, in step 406.

If an acceptable PLMN is available, a TAU, LAU, or RAU is performed with the selected PLMN associated with the PLMN identifier. In step 410, it is determined whether the TAU, LAU, or RAU is rejected with the permanent cause, due to which the SIM may be invalidated. If the TAU, LAU, or RAU is not rejected with the permanent cause, the UE 102 may be registered on the acceptable PLMN, in step 412.

If the TAU, LAU, or RAU is rejected with the permanent cause, the PLMN identifier and the RAT information associated with the acceptable PLMN is stored in the temporary forbidden list, in step 414. In step 416, the UE 102 skips the invalidation of the SIM state.

The various actions, acts, blocks, steps, and the like in the method of FIG. 4 may be performed in the order presented, in a different order, or simultaneously. Further, in some embodiments, some actions, acts, blocks, steps, and the like may be omitted, added, modified, skipped, and the like, without departing from the scope of embodiments described herein.

Figure 5:
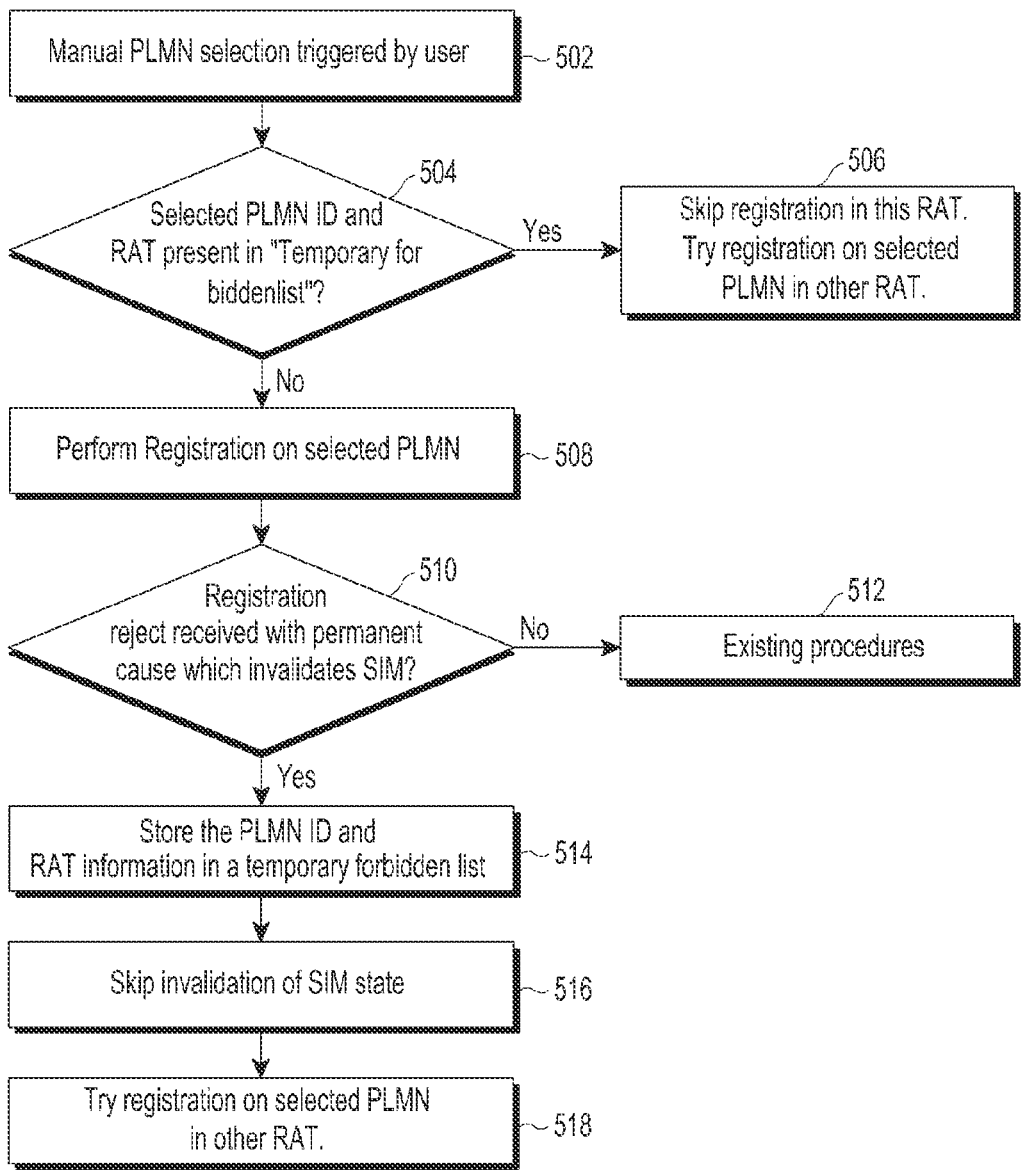
FIG. 5 is a flowchart illustrating a method for preventing the UE from entering into the permanent OOS state during a manual PLMN selection in the UE, in accordance with embodiments described herein.

FIG. 5 is a flowchart illustrating a method for preventing the UE from entering into the permanent OOS state during a manual PLMN selection in the UE, in accordance with embodiments described herein.

In step 502, manual PLMN selection is triggered by a user. In step 504, it is determined whether the selected PLMN identifier is associated with a previously rejected PLMN. This determination may be performed by checking if the PLMN identifier is present in the temporary forbidden list of the UE 102. If the selected PLMN identifier is present in the temporary forbidden list, and thus, the selected PLMN identifier is associated with a previously rejected PLMN, the registration with the selected PLMN identifier in current RAT is skipped, in step 506. In an embodiment, the UE 102 may try registering on the selected PLMN in another RAT.

If the selected PLMN identifier is not present in the temporary forbidden list, and thus, the selected PLMN identifier is not associated with a previously rejected PLMN, a TAU, LAU, or RAU is performed with the selected PLMN associated with the PLMN identifier, in step 508. In step 510, it is determined whether the TAU, LAU, or RAU is rejected with the permanent cause, due to which the SIM may be invalidated, in step 510. If the TAU, LAU, or RAU is not rejected with the permanent cause, the UE 102 is registered with the selected PLMN, in step 512.

If the TAU, LAU, or RAU is rejected with the permanent cause, the PLMN identifier and the RAT information associated with the selected PLMN are stored in the temporary forbidden list, in step 514. In step 516, the invalidation of the SIM state is skipped. In step 518, the UE 102 is registered with a previously registered PLMN or any other available PLMN.

The various actions, acts, blocks, steps, and the like in the method of FIG. 5 may be performed in the order presented, in a different order, or simultaneously. Further, in some embodiments, some actions, acts, blocks, steps, and the like may be omitted, added, modified, skipped, and the like, without departing from the scope of embodiments described herein.

Figure 6:
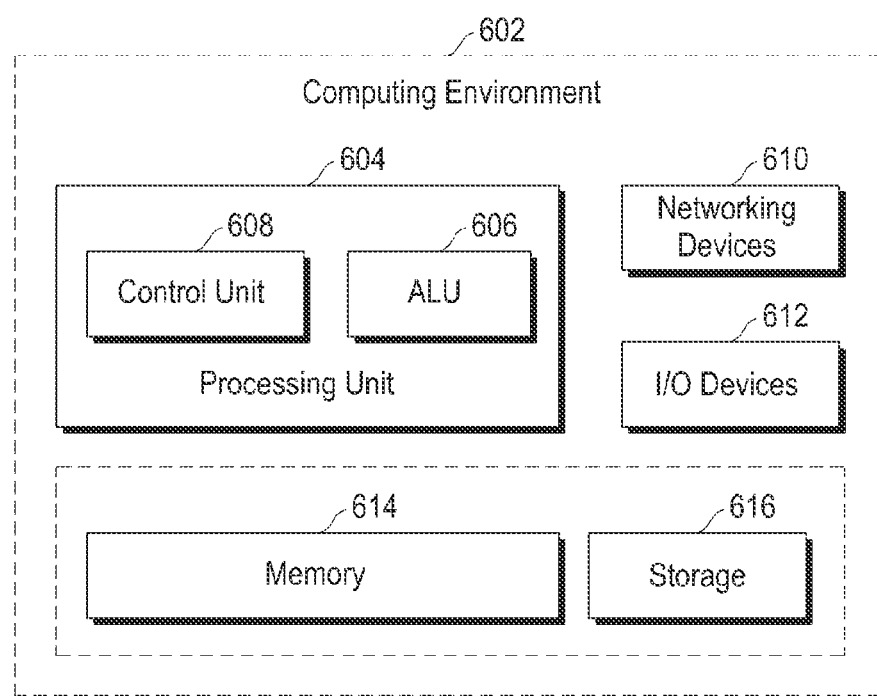
FIG. 6 is a diagram illustrating a computing environment implementing the method for preventing the UE from entering into the permanent OOS state, according embodiments described herein.

Referring to FIG. 6, a diagram illustrates a computing environment implementing the method for preventing the UE from entering into the permanent OOS state, in accordance with embodiments described herein. As depicted, a computing environment 602 includes at least one processing unit 604 that is equipped with a control unit 608 and an arithmetic logic unit (ALU) 606, a memory 614, a storage 616, a plurality of networking devices 610, and a plurality input/output (I/O) devices 612. The processing unit 604 is responsible for processing the instructions of the algorithm. The processing unit 604 receives commands from the control unit 608 in order to perform its processing. Further, any logical and arithmetic operations involved in the execution of the instructions are computed with the help of the ALU 606.

The overall computing environment 602 can be composed of multiple homogeneous or heterogeneous cores, multiple central processing units (CPUs) of different kinds, special media, and other accelerators. The processing unit 604 is responsible for processing the instructions of the algorithm. Further, the plurality of processing units 604 can be located on a single chip or over multiple chips.

The algorithm, having instructions and codes required for implementation, is stored in the memory 614, the storage 616, or both. At the time of execution, the instructions can be retrieved from the memory 614, the storage 616, or both, and executed by the processing unit 604.

For hardware implementations, various networking devices 610 or external I/O devices 612 can be connected to the computing environment to support the implementation through the networking unit and the I/O device unit.

The embodiments described herein can be implemented through at least one software program running on at least one hardware device and performing network management functions to control the elements. FIGS. 1 through 6 includes blocks that can be at least one of a hardware device or a combination of a hardware device and a software module.

The embodiments herein may be utilized in conjunction with the manufacture of integrated circuits, chip sets, or system-on-chips (SoCs). Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this disclosure.

Although certain embodiments are described herein, it will be understood by those skilled in the art that various changes in form and detail may be made therein without departing from the spirit and scope of the embodiments, as defined by the appended claims.

What is claimed is:

1. A method of preventing a user equipment (UE) from entering into a permanent out of service (OOS) state, the method comprising:
    triggering a registration request for registering the UE with a first network entity;
    receiving, at the UE, a registration reject message associated with a permanent cause from the first network entity;
    determining whether the UE was previously registered with at least one second network entity belonging to a same country as the first network entity, upon receiving the registration reject message associated with the permanent cause; and
    storing, at the UE, a network entity identifier of the first network entity in a temporary forbidden list in response to determining that the UE was previously registered with the at least one second network entity belonging to the same country as the first network entity, to prevent the UE from entering into the permanent OOS state,
    wherein the UE is in communication with the first network entity and the at least one second network entity.

2. The method of claim 1, further comprising:
    determining whether the at least one second network entity belonging to the same country as the first network entity is available; and
    automatically registering the UE with an available one of the at least one second network entity, in response to determining that the one of at least one second network entity is available.

3. The method of claim 1, wherein the first network entity is selected using one of a manual closed subscriber group (CSG) selection, an auto-to-auto reselection, and a manual public land mobile network (PLMN) selection.

4. The method of claim 1, wherein the first network entity is one of a closed subscriber group (CSG) cell, a non-CSG cell, and a public land mobile network (PLMN).

5. The method of claim 1, wherein the at least one second network entity is one of a closed subscriber group (CSG) cell, a visited PLMN (VPLMN), and a public land mobile network (PLMN).

6. The method of claim 1, further comprising:
    prior to the triggering the registration request, determining whether the temporary forbidden list comprises the network entity identifier of the first network entity.

7. The method of claim 1, wherein the network entity identifier comprises at least one of a closed subscriber group (CSG) identifier (CSGID), a public land mobile network identifier (PLMN ID), and radio access technology (RAT) information.

8. A user equipment (UE) configured to avoid a permanent out of service (OOS) state, the UE comprising:
a processor; and
a memory for storing computer-executable instructions that configures the processor to:
trigger a registration request for registering with a first network entity;
receive a registration reject message associated with a permanent cause from the first network entity;
determine whether the UE was previously registered with at least one second network entity belonging to a same country as the first network entity, upon receiving the registration reject message associated with the permanent cause; and
store a network entity identifier of the first network entity in a temporary forbidden list in response to determining that the UE was previously registered with the at least one second network entity belonging to the same country as the first network entity, to prevent the UE from entering into the permanent OOS state,
wherein the UE is in communication with the first network entity and the at least one second network entity.

9. The UE of claim 8, wherein the processor is further configured to:
determine whether the at least one second network entity belonging to the same country as the first network entity is available; and
automatically register the UE with an available one of the at least one second network entity, in response to determining that the one of the at least one second network entity is available.

10. The UE of claim 8, wherein the first network entity is selected using one of a manual closed subscriber group (CSG) selection, an auto-to-auto reselection, and a manual public land mobile network (PLMN) selection.

11. The UE of claim 8, wherein the first network entity is one of a closed subscriber group (CSG) cell, a non-CSG cell, and a public land mobile network (PLMN).

12. The UE of claim 8, wherein the at least one second network entity is one of a closed subscriber group (CSG) cell, a visited PLMN (VPLMN), and a public land mobile network (PLMN).

13. The UE of claim 8, wherein, prior to triggering the registration request, the processor is further configured to determine whether the temporary forbidden list comprises the network entity identifier of the first network entity.

14. The UE of claim 8, wherein the network entity identifier comprises at least one of a closed subscriber group (CSG) identifier (CSGID), a public land mobile network identifier (PLMN ID), and radio access technology (RAT) information.

* * * * *